United States Patent [19]
Martinez

[11] 3,877,139
[45] Apr. 15, 1975

[54] GLASSLESS MIRROR

[75] Inventor: Eugene Martinez, Irvington-on-Hudson, N.Y.

[73] Assignee: Kamar Products, Inc., Irvington-on-Hudson, N.Y.

[22] Filed: Aug. 30, 1973

[21] Appl. No.: 392,987

[52] U.S. Cl. ............... 29/469.5; 350/320; 156/251
[51] Int. Cl. .............................................. G02b 5/08
[58] Field of Search ...... 156/196, 251, 250; 29/267; 350/320; 29/445, 481

[56] References Cited
UNITED STATES PATENTS

| | | | |
|---|---|---|---|
| 2,485,648 | 10/1949 | Norquist | 29/481 X |
| 3,454,692 | 7/1969 | Marcus | 350/320 UX |
| 3,499,744 | 3/1970 | Tolliver | 350/320 UX |
| 3,533,897 | 10/1970 | Robbins, Jr. et al. | 350/320 |
| 3,809,601 | 5/1974 | Fletcher | 156/250 X |

*Primary Examiner*—Francis S. Husar
*Assistant Examiner*—Carl Rowold
*Attorney, Agent, or Firm*—J. B. Felshin; Marvin Feldman

[57] ABSTRACT

This is a flat, thin glassless mirror for optical and other purposes. This mirror is made by precutting a sheet metal piece to the proper shape and then forming it in a manner that avoided or minimized internal strain. This is done by placing the precut sheet metal piece on a female forming die, then on top of the sheet metal piece is placed a male die comprising a fairly thick pad made of a firm but resilient material (such as rubber or polyurethane). Pressure is applied to the pad which, in turn, forces or flows the sheet metal piece into a pan form which becomes the frame of the mirror. Because the flatness of the plane formed by the "First Point of Contact" line and the dimensional size of this plane are the only critical dimensions, the rest of the pan can assume any form it comfortably wishes, avoiding any unnecessary strains that induce warping. Because the sheet metal piece has been precut to shape, if any deburring is necessary, it can be done before forming, thus avoiding the handling that might deform the finished pan. This is possible only because the distance from the "First Point of Contact" line to the edge is not important and allows the precut sheet metal to move in the die as it sees fit to do so. The structure is then completed by wrapping metalized polyester mirror film around the edges of the pan and gluing it to the back of the pan using a cohesive adhesive. The fact that the pan edges do not necessarily form rounded corners with vertical walls, greatly facilitates the application of the mirrored film to the structural or support pan.

The final stage in the construction of the mirror is to shrink the film taut using heat applied to the metalized polyester film.

19 Claims, 11 Drawing Figures

GLASSLESS MIRROR

This invention relates to flat, thin glassless mirrors and to the methods of making them.

Until now, the state of the art indicated the use of a sheet metal pan formed for rigidity and over which was stretched a metalized plastic film.

The "pan" was made by stamping the metal with a male and female die and then trimming the edges. The raw trimmed edges were then deburred by hand.

Because of the internal strains set up in the structure of the sheet metal by the severity of the forming and trimming operations and handling required by the deburring of the edges, it was extremely difficult and comparatively expensive to produce a "flat" pan. Without a flat pan, the mirror produced by stretching the film on the pan would have a "Coney Island" or distorted effect and be unusable.

The nature of the design of the pan with its vertical walls made the production of a mirror with reasonably sharp corner radii extremely difficult. These vertical walls needed for rigidity in conjunction with the large corner radii also made the attachment of the mirrored film difficult particularly in pleating and tucking it around corners carefully to avoid surface wrinkles.

The invention assumes that in making a structural panel that will serve to properly support the mirrored film only two requirements are important (1) the rigidity of the panel after the film has been applied and (2) the flatness of the point (as a two dimensional line) at which the film first makes contact with the pan.

The concept of where the mirrored film makes "First Point of Contact" to the support structure as previously described eliminates the need for edge walls at right angles to the mirror surface thus greatly improving the flatness of the mirror; eliminates the elaborate and difficult to form (without stressing the metal) corner radii; facilitates application of the film; eliminates need for trimming to size and deburring after forming and allows for a much thinner thickness of the finished product.

This concept can be applied to the fabrication of small mirrors such as those used for ladies' compacts and also to making collapsing rear view and/or makeup mirror for automobile use by substituting the sheet metal pan with one made of a semi-rigid material.

A further object of this invention is to provide a strong, durable and accurate mirror of the character described which shall be relatively inexpensive to manufacture and which shall be practical and efficient to a high degree in use.

A further object of this invention is to provide a method of making mirrors of the character described which shall be economical to carry out with a high degree of flatness of the mirror surface.

Other objects of this invention will in part be obvious and in part hereinafter pointed out.

The invention accordingly consists in the features of construction, combinations of elements, and arrangement of parts which will be exemplified in the construction hereinafter described and of which the scope of invention will be indicated in the following claims.

Figure 1:
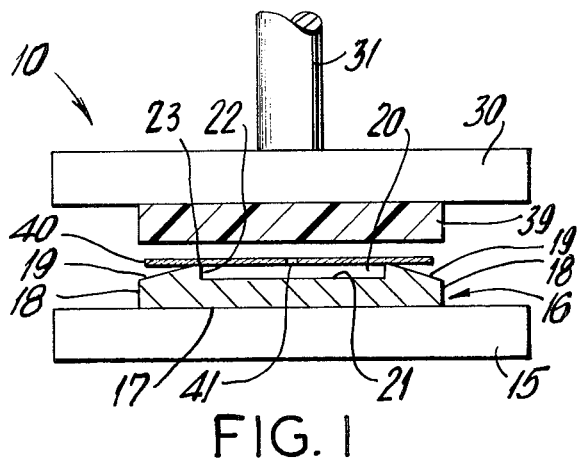
FIG. 1 is a side elevational view, partly in vertical cross-section illustrating one step in the making of the pan or frame for the mirror.

Referring now in detail to the drawing, particularly to FIGS. 1—6, numeral 10 designates apparatus for making the pan 11 forming part of the mirror 12 embodying the invention, by the method embodying the invention.

The apparatus 10 comprises a metal plate or base 15 supporting a steel female die 16 fixed thereto. Said die 16 has a flat undersurface 17, vertical outer side edges 18, upwardly and inwardly sloping top peripheral surfaces 19 and a central cavity 20 having a flat horizontal bottom surface 21 and inner substantially vertical side surfaces 22 forming junction lines or ridges 23 with the surfaces 19. The ridges 23 must be precision machined and all must be a single flat horizontal plane.

Figure 3:
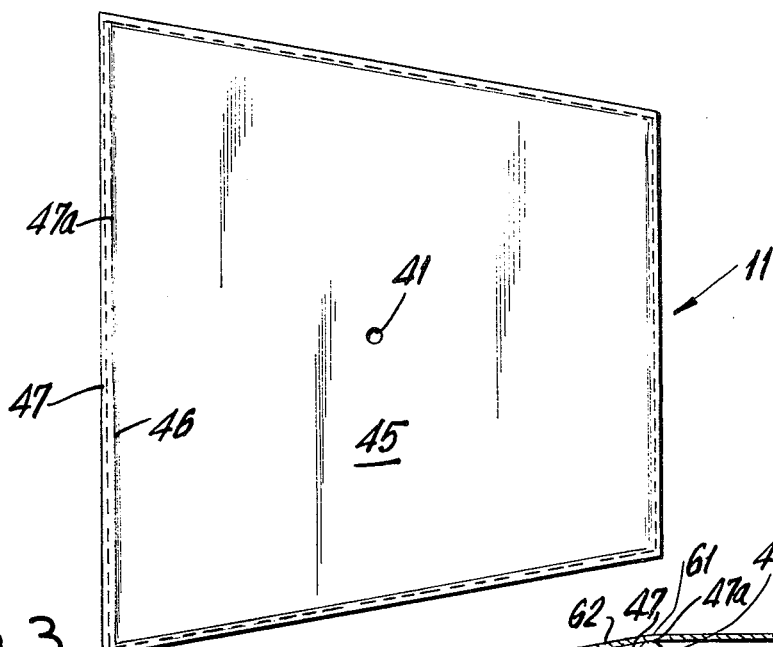
FIG. 3 is a top plan view of a pan made with the process illustrated in FIGS. 1 and 2.
Figure 6:
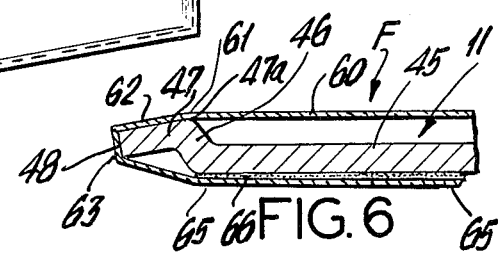
FIG. 6 is a partial cross-sectional view taken on line 6—6 of FIG. 4.
Figure 4:
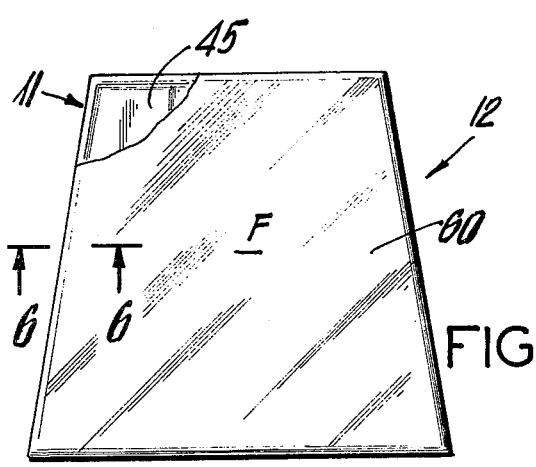
FIG. 4 is a top or front view of a completed mirror embodying the invention and comprising a pan made by the process illustrated in FIGS. 1 and 2, and with part of the mirror sheet broken away.
Figure 5:
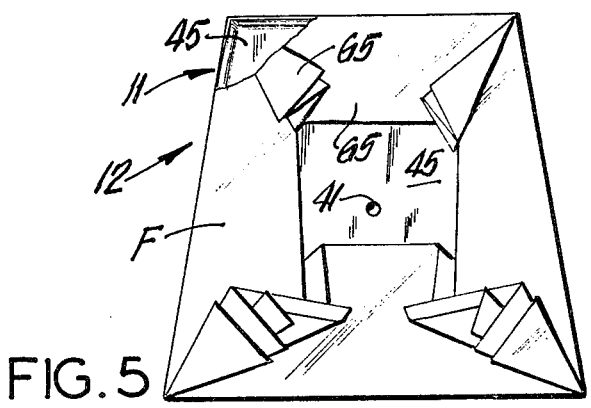
FIG. 5 is a bottom or rear view of the mirror shown in FIG. 4, with part of the mirror sheet broken away.

The apparatus 10 further comprises a platen 30 fixed to a reciprocating ram 31. The plate 15 and the platen 30 and ram 31 are parts of a power press having means to reciprocate the ram down with a power stroke toward the die 16, and up to spaced relation above the die. The power press may be of conventional design. Fixed to the underside of the platen 30 is a pad 39 which is plastic, firm but resilient, such as rubber or polyurethane. The pad 39 should be thicker than the depth of the cavity 20 in the die 16 and should be of a shape about similar to the outer shape of the die. The pad 39 acts as the male die to female die 16. As shown in FIGS. 3, 4 and 5, the finished mirror is to be keystone shaped to produce a keystone shaped pan 11, as will be explainted hereinafter.

A sheet metal plate 40 of uniform thickness and formed with a substantially centralized vent hole 41, is placed on the die ridges 23. This plate will be keystone shaped to produce a pan of the same shape. The plate 40 substantially overlies the sloping surfaces 19 all around. The outer edges of plate 40 can be deburred prior to shaping it into the pan 11. The lines or ridges 23 are the first point of contact of the plate 40 to the die. Force is then applied to the platen downwardly to force the metal plate 40 against the surfaces 19 of the die and into the cavity 20 and against the bottom surface 21 thereof. The pad may be about 1 inch in thickness.

This invention assumes that in making the structural panel or pan 11 that will serve to properly support the mirrored film, to be described hereinafter, only two requirements are important (1) the rigidity of the panel after the film has been applied and (2) the flatness of the two dimentional plane of the ridges or lines at which the film first makes contact with the pan.

After formation the pan 11 has a flat bottom wall 45 (FIG. 6), an upwardly and outwardly inclined extending web 46 and a downwardly and outwardly extending flange 47.

Between portions 46, 47 is the high point or line 47a which is in a flat plane because lines 23 of the die are in a flat plane.

The two important requirements mentioned above are achieved by pre-cutting the sheet metal piece 40 to proper shape and then forming it in a manner that avoids or minimizes internal strain. When pressure is applied to the platen downwardly, the pad 39 forces or flows the sheet metal plate or piece 40 into a pan form which becomes the frame or support of the mirror film F described hereinafter. The portions 46 do not contact the inner surfaces 22 of the pan throughout.

Because of the flatness of the plane of lines 47a of the pan formed by the First Point of Contact lines 23 of the die, and the dimensional size of this plane are the only critical dimensions, the rest of the pan 11 can assume any form it takes, avoiding any unnecessary strains that induce warping. It will be noted that the metal plate does not necessarily contact the inner surfaces 22 of the die. Its exact shape all around the outer periphery of the cavity of the die is unimportant as long as the ridges 23 are contacted throughout.

Because the sheet metal plate or piece 40 has been precut to shape, if any deburring is necessary, it can be done before forming, thus avoiding handling that might deform the finished pan. This is possible only because the distance from the lines 47a (first point of contact with lines 23 of the die) to the outer edges 48 of flanges 47 is not important and allows the pre-cut metal to move in the die as it sees fit. The exact location of outer edges 48 is not important.

After the pan is finished, mirrored film F comprising metalized polyester mirror film is wrapped around the edges of the pan and gluing to the back of the pan using a cohesive adhesive. The fact that pan edges do not necessarily form rounded corners with vertical walls, greatly facilitates the application of the mirrored film to the structural or support pan. The film F has a top flat portion 60, portions 61 contacting the first point of contact lines 47a of the pan with the film, portions 62 contacting the flanges 47, portions 63 wrapped about edges 48 of the pan and portions 65 flattened and wrapped and overlapped at the back or underside of the pan. The overlapping portions 65 of the film are glued to each other and to the back of the pan by layers 66 of contact cement. Both surfaces of the pan and the portions 65 of the film F are coated. This cement is not sticky until both coated surfaces are stuck together by this cohesive adhesive. One adhesive that is satisfactory is F.C. 1368 manufactured by Minnesota, Mining and Minerals Co.

Portion 60 of the mirror film F is undistorted and flat and does not give a Coney Island distorted effect. This is due to the fact that portions 47a of the pan are in a flat plane because of contact with the lines or ridges 23 of the die, and there are no strains on the pan during forming thereof to distort the lines 47a of the pan.

In FIGS. 7–11 there is illustrated a small mirror 70 such as those used for ladies bags or compacts, or make up mirrors for automobiles, and also illustrate the method of making such mirrors.

Figure 2:
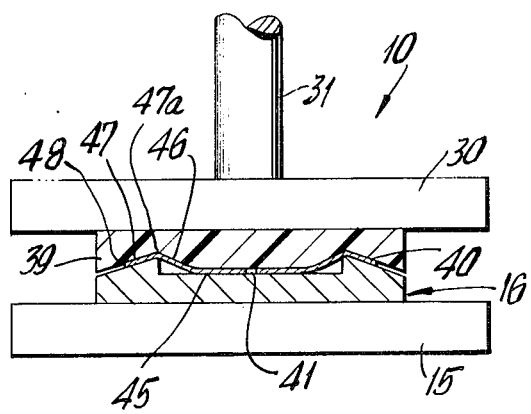
FIG. 2 is a view similar to FIG. 1 and illustrating a further step.
Figure 7:
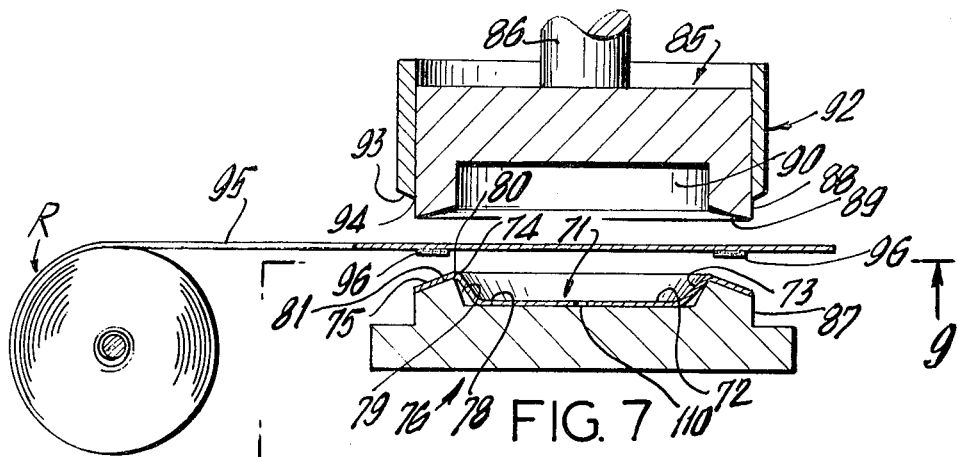
FIG. 7 is a vertical cross-sectional view illustrating one step in the making of a small round mirror with use of a pan made in accordance with the method illustrated in FIGS. 1 and 2.

In FIG. 7 there is shown a small round or other shaped pan 71 which may be made with apparatus 10 and by the method illustrated in FIGS. 1 and 2. This pan can be round and small. It also has a flat bottom wall 72, upwardly and outwardly inclined peripheral walls 73, top bent back ridges, lines or crests 74, all in a well defined flat plane and downwardly and outwardly sloping flanges 75. Since these pans 71 are made in the manner described in FIGS. 1 and 2, the crests will be in a perfectly flat plane. This pan 71 is placed on a holding jig 76 having a cavity to receive the pan. The shape of the upper end of the jig 76 is substantially like the upper end surface of the die 16 except for size and peripheral shape. Thus, the jig 76 has a central cavity forming a flat bottom surface 78, an inner upwardly extending peripheral surface 79, a top ridge or crest 80 and an outwardly and downwardly sloping upper surface 81. The inner surface 79 may be vertical or inclined, but in any event there should be a space between wall 73 and the inner surface 79 because the inclinations of the pans 71 are not uniform, since they are pressed by a rubber or rubber like pad into an oversize cavity in the die (FIGS. 1 and 2). The surfaces 79 should accommodate any of the pans 71.

The jig 76 is a base of a power press. Above the jig is a setting tool 85 on a ram 86, coaxial with the jig. The jig 76 has an outer round surface 87 (when used for round mirrors). The tool 85 has an outer round surface 88 similar to and aligned with surface 87. Extending inwardly and upwardly from surface 88 is an inclined undersurface 89 similar to surface 81. Undersurface 89 extends to an upwardly recessed central cavity 90 in tool 85.

Slidably mounted on tool 85 is a sleeve like trimming knife 92 having a downwardly and inwardly sloping surface 93 forming a sharp cutting or shearing edge 94 adjacent surface 88. Any suitable well known mechanism may be provided to reciprocate the trimming knife 92 down below the setting tool 85 to the position of FIG. 8 for the purpose hereinafter appearing.

As shown in FIG. 7, a roll R of a strip 95 of mirroring film, is positioned in any suitable manner so that the film can be pulled off the roll to the right, on a position shown in FIG. 7.

Figure 8:
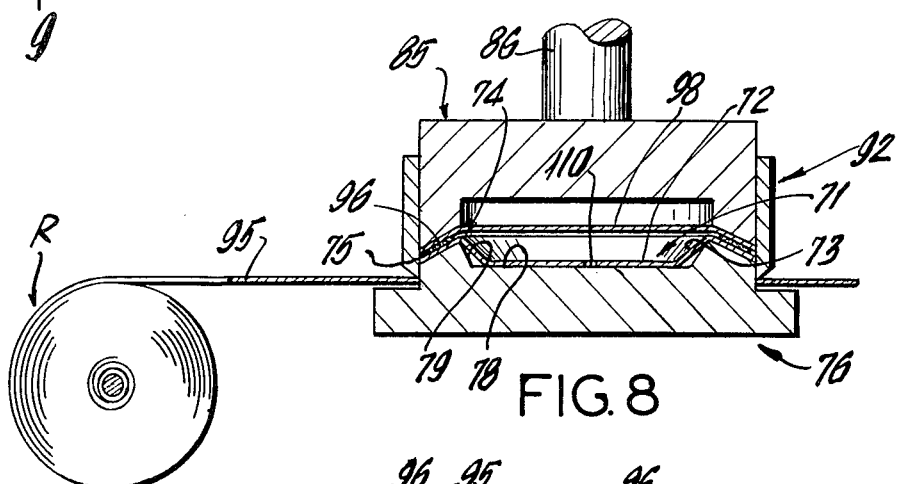
FIG. 8 is similar to FIG. 7, but shows a further step in the process.
Figure 9:
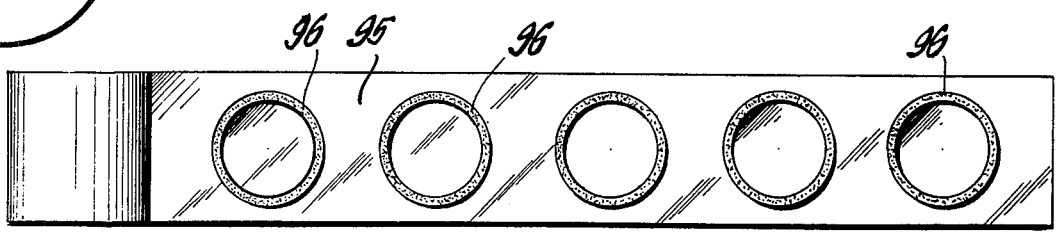
FIG. 9 is a bottom plan view of the roll of mirror film shown in FIG. 7 taken on line 9—9 of FIG. 7.
Figure 10:
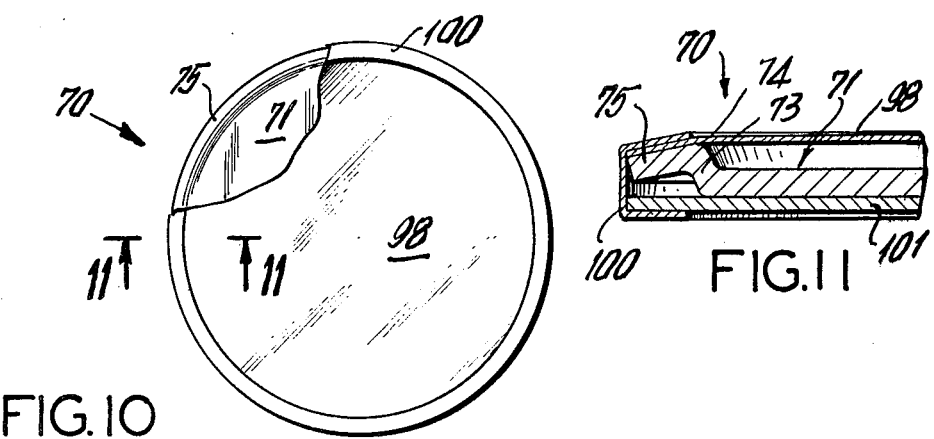
FIG. 10 is a top view of a mirror made by the process illustrated in FIGS. 7, 8 and 9, and with part of the mirror film broken away.
Figure 11:
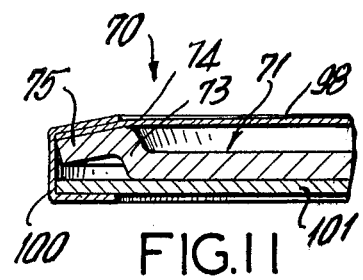
FIG. 11 is a partial cross-sectional view taken on line 11—11 of FIG. 10.

Applied to the underside of strip 95 is a row of aligned similar, equally spaced circular areas of cohesive adhesive 96. The strip 95 is located below the setting tool but above the jig 76 in spaced relation to both. A coated area 96 should be located above flange 75 of a pan 71 on the jig 76 in coaxial relation thereto. Any suitable well known mechanism may be used to intermittently feed the strip 95 off the roll R to successively bring the coated rings 96 into coaxial relation with a pan in the jig. As each ring is in such axial relation, the setting tool is first moved down to press the coated portion of the strip 95 against the flange 75 of the pan leaving an area 98 of the mirror above the cavity in the pan 71 as shown in FIG. 8. Said portion 98 will be flat and undistorted because the first point of contact will be the ridges 80 which is in a flat plane, as described hereinabove. Thereafter the trimming knife 92 is moved down to the position of FIG. 8 to cut the film 95 closely beyond the outer edge of flange 75.

The pan 71 now has a piece of mirror film 98 adhered to its flange 75. The trimming knife is then raised and the setting tool is raised and the pan with its mirror can be lifted off the jig 76.

The pan 71 with its mirror film 98 applied thereto may be placed in a frame, bezel or ring 100 and may be provided with a backing disc 101, or it may be mounted in any suitable way into a compact or frame or mounted on an automobile vizor.

The final stage in the construction of the mirror is to shrink the film taut using heat applied to the metalized polyester film to shrink the film.

The vent hole 41 in pan 11 and vent hole 110 in pan 71 prevent bellowing of the portion of the mirror film which contacts the ridges of the pans.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. A process for making a mirror comprising placing a flat piece of deformable material over a cavity of a female die having a cavity and formed with a bottom surface, an inner surface extending up from the periphery of said bottom surface, and a top flange sloping downwardly and outwardly from a peripheral ridge at the upper end of said inner surface which ridge is in in a two dimentional plane, with said piece over said ridge and contacting said ridge on a first line of contact and extending beyond said ridge all around and overlapping said sloping flange, applying a male die over the piece and over said sloping flange, and applying pressure on said male die to press the piece against said ridge on said first line of contact and cause the piece to flow into said cavity and be pressed against said flange, whereby to form a pan having a bottom portion contacting the bottom surface of said cavity, a portion inclined upwardly and outwardly from the periphery of said bottom portion and a portion pressed against said ridge of said female die all around, and a ridge portion contacting said flange, whereby said ridge portion of said pan lies in a flat plane conforming to the flat plane of the ridge of the female die, then applying a mirror film to the ridge of the pan in contact with said pan ridge and causing said film to contact said sloping portion of said pan and to be attached to said pan and to have a flat mirror surface over said cavity.

2. The process of claim 1, wherein the attachment of the film to said pan is accomplished by adhering said film to the pan by adhesive.

3. The process of claim 2, wherein said adhesive is applied between the film and said sloping flange of the pan.

4. The process of claim 2, wherein said film is folded against the underside of said pan and adhered to said underside of said pan by said adhesive.

5. The process of claim 3, and trimming the film all around adjacent the outer edge of said sloping portion of the pan.

6. The process of claim 3, wherein the adhesive is preapplied to the underside of the film in shape of a ring conforming to the sloping flange of the pan.

7. The process of claim 1, wherein the flat piece of deformable material is a piece of sheet metal.

8. A process for making a mirror comprising placing a flat piece of deformable material over a cavity of a female die having a cavity forming a bottom surface and an inner surface extending substantially straight up from the periphery of said bottom surface and a top flange sloping downwardly and outwardly from a peripheral ridge at the upper end of said inner surface, which ridge lies in a two dimensional plane, with said piece contacting said ridge all around on a first line of contact and overlapping said sloping flange, then applying pressure to a male die disposed above said piece, to press said piece against said ridge on said first line of contact, to cause said piece to flow into said cavity and against said ridge and against said sloping flange whereby to form a pan having a bottom wall, an inner upwardly and outwardly inclined wall extending from said bottom wall, a ridge conforming to said ridge of said die and a sloping flange contacting the sloping flange of said die, then placing the pan in a cavity of a holding jig formed with a cavity to receive said pan, placing a mirrored film having a ring of adhesive applied to its underside, conforming 9. The process of claim 8, wherein the forcing of the portion of the film which is located above the ring of adhesive, is accomplished with a setting tool, and wherein the trimming of the film is accomplished with a trimming knife slidable on said setting tool.

10. The process of claim 8, wherein said film comprises a strip of said film coming off a roll of said film.

11. The process of claim 1, and deburring the edge of said piece prior to pressing said piece against said die.

12. The process of claim 1, wherein said male die comprises a resilient pad.

13. The process of claim 12, in which the male die is such as not to press said piece against the entire bottom and inner surface of said female die.

14. The process of claim 8, wherein said male die comprises a resilient pad.

15. The process of claim 14, in which the male die is such as not to press said piece against the entire bottom and inner surface of said female die.

16. A process for making a mirror comprising placing a flat piece of deformable material over a cavity of a female die having a cavity and formed with a bottom surface, an inner surface extending up from the periphery of said bottom surface, and a peripheral ridge at the upper end of said inner surface which ridge is in a two dimentional plane, and with a flange surrounding said ridge, and disposed therebelow, with said piece over said ridge and contacting said ridge on a first line of contact in said two dimentional plane and said piece extending beyond said ridge all around and overlapping said flange, applying a male die over the piece and over said flange, and applying pressure on said male die to press the piece against said ridge on said first line of contact and cause the piece to flow into said cavity and be pressed against said bottom surface and flange, whereby to form a pan having a bottom portion contacting the bottom surface of said cavity, a portion extending upwardly from the periphery of said bottom portion, and a ridge portion pressed against said ridge of said female die all around, and a flange portion contacting said flange of said die, whereby said ridge portion of said pan lies in a two-dimentional plane conforming to the two dimentional plane of the ridge of the female die, then applying a mirror film to the ridge of the pan in contact with said pan ridge and causing said film to contact said flange of said pan and to be attached to said pan and to have a flat mirror surface over said cavity.

17. A process for making a mirror comprising placing a flat piece of deformable material over a cavity of a female die having a cavity forming a bottom surface and an inner surface extending up from the periphery of said bottom surface, a ridge at the upper end of said inner surface, which ridge lies in a two dimentional plane, and with a flange extending outwardly of said ridge and therebelow, with said piece contacting said ridge all around on a first line of contact in said two dimentional plane and overlapping said flange, then applying pressure to a male die disposed above said piece, to press said piece against said ridge on said first line of contact to cause said piece to flow into said cavity and against said ridge and against said flange whereby to form a pan having a bottom wall, an inner wall extending upwardly from said bottom wall, a ridge conforming to said ridge of said die and disposed in a two dimentional plane, and a flange contacting the flange of said die, then placing the pan in a cavity of a holding jig formed with a cavity to receive said pan, placing a mirrored film having a ring of adhesive applied to its underside conforming to the shape of the flange on said pan, over said pan, with the adhesive ring aligned with said flange, then forcing the portion of the film having the adhesive ring at its underside against said flange, to cause said portion of said film to adhere to said flange, with the portion of the film surrounded by said adhesive ring disposed in a plane above the cavity in said pan, and trimming the film close to the periphery of the portion thereof which is adhered against said flange of said pan.

18. The process of claim 16, in which the male die is such as not to press said piece against the entire bottom and inner surface of said female die.

19. The process of claim 17, in which the male die is such as not to press said piece against the entire bottom and inner surface of said female die.

* * * * *

UNITED STATES PATENT OFFICE
CERTIFICATE OF CORRECTION

PATENT NO. : 3,877,139
DATED : April 15, 1975
INVENTOR(S) : Eugene Martinez

It is certified that error appears in the above-identified patent and that said Letters Patent are hereby corrected as shown below:

The following was omitted and should be added to complete Claim 8:

-- to the circular shape of the sloping flange of said pan, with the adhesive ring aligned with said sloping flange, then forcing the portion of the film having the adhesive ring at its underside against said flange, to cause said portion of said film to adhere to said flange, with the portion of the film surrounded by said adhesive ring disposed in a plane above the cavity in said pan, and trimming the film close to the periphery of the portion thereof which is adhered against said flange of said pan. --

This certificate supersedes Certificate of Correction issued August 12, 1975.

Signed and Sealed this third Day of February 1976

[SEAL]

Attest:

RUTH C. MASON
*Attesting Officer*

C. MARSHALL DANN
*Commissioner of Patents and Trademarks*